United States Patent [19]

Jurgensen

[11] Patent Number: 4,819,177
[45] Date of Patent: Apr. 4, 1989

[54] METHOD FOR CURING RUBBER ARTICLES

[75] Inventor: John R. Jurgensen, Urbana, Ohio

[73] Assignee: Systran Corporation, Dayton, Ohio

[21] Appl. No.: 64,965

[22] Filed: Jun. 19, 1987

[51] Int. Cl.$^4$ .................. B29C 35/02; G06F 15/46
[52] U.S. Cl. ........................... 364/476; 264/40.1;
264/40.6; 264/236; 364/473; 364/500; 425/144;
425/157; 425/160
[58] Field of Search ............. 264/40.1, 40.6, 236,
264/347; 425/29, 30, 143, 144, 156, 157, 160,
135, 155; 364/473, 476, 500, 557, 569

[56] References Cited

U.S. PATENT DOCUMENTS

| | | | |
|---|---|---|---|
| 3,649,729 | 3/1972 | Davis et al. ............... | 364/473 X |
| 3,659,974 | 5/1972 | Neugroschl ............... | 425/29 |
| 3,718,721 | 2/1973 | Gould et al. .............. | 425/29 X |
| 3,819,915 | 6/1974 | Smith ....................... | 364/473 |
| 3,836,614 | 9/1974 | Neugroschl .............. | 264/40.1 |
| 3,980,743 | 9/1976 | Smith ....................... | 264/236 X |
| 4,022,555 | 5/1977 | Smith ....................... | 425/29 |
| 4,044,600 | 8/1977 | Claxton et al. ........... | 264/236 X |
| 4,344,142 | 8/1982 | Diehr, II et al. ......... | 364/473 |
| 4,371,483 | 2/1983 | Mattson .................... | 264/40.6 |
| 4,517,146 | 5/1985 | Takasu et al. ............ | 264/40.6 |
| 4,542,466 | 9/1985 | Arimatsu .................. | 364/473 |
| 4,551,807 | 11/1985 | Hsich et al. ............... | 364/473 |

FOREIGN PATENT DOCUMENTS

| | | | |
|---|---|---|---|
| 56-4447 | 1/1981 | Japan ....................... | 425/29 |
| 57-27737 | 2/1982 | Japan ....................... | 264/40.1 |
| 60-6416 | 1/1985 | Japan ....................... | 364/473 |
| 60-178010 | 9/1985 | Japan ....................... | 264/40.1 |
| 467835 | 5/1975 | U.S.S.R. .................. | 425/143 |
| 588134 | 1/1978 | U.S.S.R. .................. | 425/144 |

Primary Examiner—Jeffery Thurlow
Assistant Examiner—Leo B. Tentoni
Attorney, Agent, or Firm—Biebel, French & Nauman

[57] ABSTRACT

A method for curing rubber in a heated mold in which the temperature of the mold is measured after closure and variations in temperature from an optimum cure temperature are used to adjust elapsed cure times which decrement an optimum cure time. The adjustment of elapsed cure time is determined by an algorithm which utilizes the 18° F. (10° C.) doubling rule; that is, that the rate of cure doubles for each increase in temperature of 18° F. (10° C.) and halves for each decrease in temperature of 18° F. (10° C.). Accordingly, the algorithm reduces the cure time remaining at a rate exceeding the actual elapsed time if the temperature of the mold is measured and determined to be above the optimum or set point temperature, and conversely, the cure time remaining is lengthened by reducing the cure time remaining at a rate below the actual elapsed time rate if the measured temperature of the mold is below the set point temperature. When cure time remaining is less than or equal to zero a command is given to open the mold and remove the cured article.

6 Claims, 4 Drawing Sheets

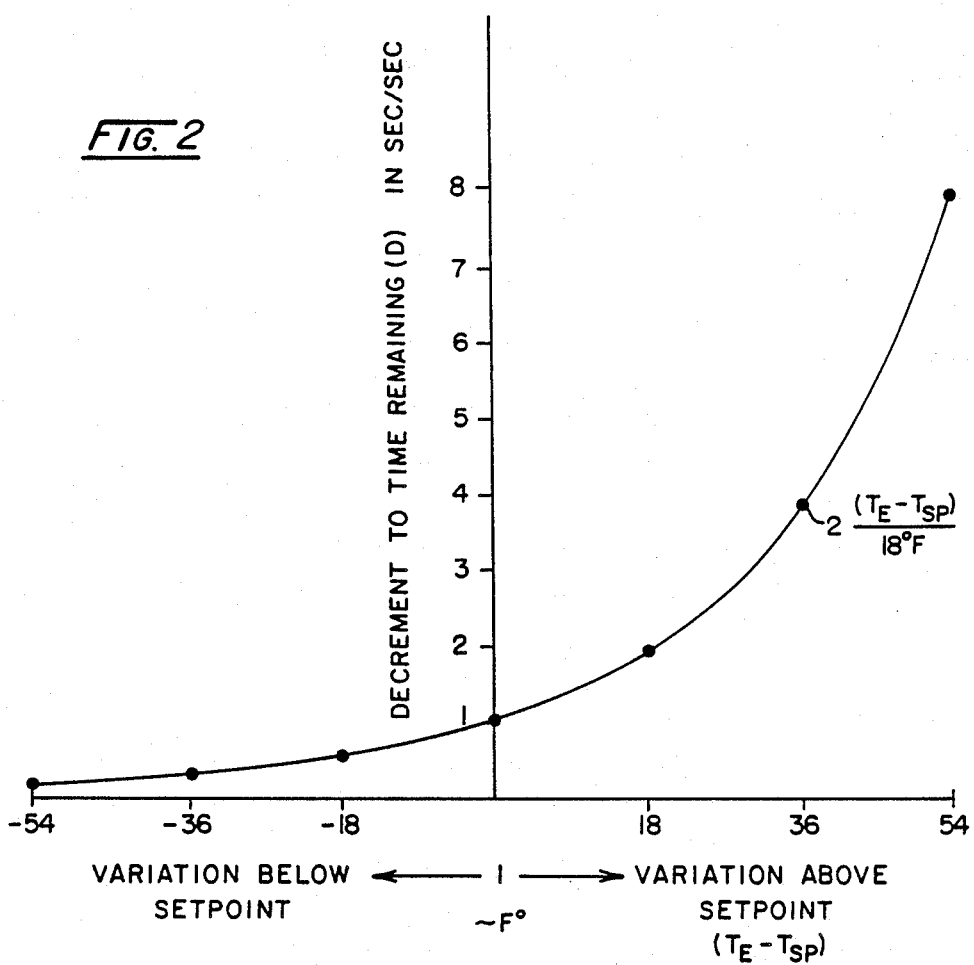

WHERE:

- $T_E$ – PROCESS MEASURED TEMPERATURE
- $T_{SP}$ – DESIRED SETPOINT TEMPERATURE FROM CUREMETER CURVES

ALARM – TEMPERATURE ERROR TOO LARGE TO MAKE PRODUCT – WARN OPERATOR

- $t_R$ – TIME REMAINING. UNITS BASED ON CLOCK UNITS AND MEASURED CURE TIME UNITS
- $\Delta T$ – TEMPERATURE ERROR OR DEVIATION FROM SET POINT

FPASS – 1 DURING FIRST PASS

METHOD FOR CURING RUBBER ARTICLES

BACKGROUND OF THE INVENTION

The present invention relates to methods of curing rubber in a heated mold and, more particularly, to methods of curing relatively small rubber articles in which temperature measurements are made during the curing period, and the total curing time is decremented at a rate corresponding to the temperature measurements.

Many attempts have been made to develop a system which can provide optimal time and temperature values for use in operating a mold for curing rubber articles. There are two main advantages to optimizing the cure time of rubber. First, rubber which is neither overcured nor undercured possesses the properties originally sought in determining the type of cure. Second, utilizing optimal cure times and temperatures makes the most efficient use of a curing mold and minimizes the energy required to operate it.

A problem with targeting optimum cure times and temperatures is that the cure control system may be incapable of maintaining a uniform set or target temperature for the mold, due to the cyclical operation of heating elements associated with the mold, and the fact that the mold might have to be opened during a cure thereby lowering the temperature of the mold cavity. With each increase or decrease in mold temperature, a variation in optimum cure time results.

With the advent of computer controls, it became possible to monitor the temperature of a mold and adjust the curing time and/or temperature to provide optimal cure for the particular article in the mold. Such systems typically include a mold having a temperature probe which sends a signal to a computer control. The computer control includes a timer which measures the elapsed time of cure and incorporates that value and the measured temperature value into the well-known Arrhenius Equation. An example of such a system in disclosed in the Arimatsu U.S. Pat. No. 4,542,466.

In another example, shown in the Mattson U.S. Pat. No. 4,371,483, the Arrhenius Equation is utilized to derive "cure equivalents", and the amount of cure time is determined by the number of cure equivalents generated at the particular temperatures occurring within the mold over the elapsed time of cure. A disadvantage with the aforementioned systems is that it is necessary to perform complicated calculations which can require the entry of parameters which may vary from one rubber compound to another. Accordingly, there is a need for a system and method for curing a rubber article which utilizes a simplified formula that does not require complicated calculations and entry of such parameters.

SUMMARY OF THE INVENTION

The invention is a method for controlling the state of cure of a rubber article during curing in a heated mold in which the mold temperature may vary from a predetermined set point temperature. The temperature is constantly monitored by a temperature control such that an effective cure time formula can be solved at anytime, preferably periodically, with the effective cure time being decremented from the cure time remaining to arrive at a new cure time remaining value. When the cure time remaining is reduced to zero (or less than zero), the mold is opened and the cured rubber article removed.

The method of the invention is directed particularly to the curing of relatively small rubber articles of ¼ inch or less in thickness which are placed in molds heated on both sides for effecting a quick temperature rise to the desired set point. Consequently, the method need not address the problems arising from curing relatively thick rubber articles which may have an internal temperature gradient that might cause varying cure rates throughout the article.

However, the method of the invention is designed specifically to compensate for deviations from the optimum cure temperature for a given rubber article by adjusting actual elapsed cure time to an effective elapsed cure time which is then decremented from the cure time remaining to update that value. The algorithm utilized by the method of the present invention is based upon the well-known property of rubber vulcanization in which the rate of cure of a rubber article is doubled for every 10° C. (18° F.) increase in temperature and halved for every 10° C. (18° F.) decrease in temperature.

The method of the invention comprises the initial step of selecting an optimum cure time and temperature for the rubber article to be cured. An optimum cure time may be derived from curemeter curves generated by laboratory tests of the rubber. Such curemeter curves plot the torque of the material as a function of cure time at a predetermined temperature. The cure time is held to be the time required to reach 90% of the maximum torque achieved by curing.

The next step of the method consists of raising the temperature of the mold to the optimum or set point temperature. The rubber is then placed within the mold cavity and the mold closed.

At time intervals subsequent to the placing of the rubber within the mold cavity, the temperature of the mold is measured and a decrement to the cure time remaining is calculated with the formula $$D = 2^{AC}(t_n - t_{n-1})$$

where D is the decrement to cure time remaining (i.e., the effective elapsed cure time), AC is a time factor exponent equaling $(T_E - T_{SP})/18°$ F., where $T_E$ is the measured temperature in °F. and $T_{SP}$ is the optimum cure or set point temperature in °F., and $(t_n - t_{n-1})$ is the number of real-time seconds since the last solution of the time remaining algorithm (i.e., the actual elapsed time).

The decrement to cure time remaining, D, is then used to calculate or update the cure time remaining by being subtracted therefrom in accordance with the formula $$t_R = t_R - D$$

where $t_R$ is the cure time remaining. The "=" sign is to be thought of as meaning "replaced with" and is a standard expression in programming notation.

Finally, after cure time remaining becomes less than or equal to zero, the mold is opened and the article is removed.

In a preferred embodiment of the invention, the cure time remaining algorithm is entered periodically about once each second by the controller, a new value of time remaining $t_R$, is computed, and the program exited. This continues until $t_R$ becomes less than or equal to zero. At this time, the mold press is opened and the time remaining timer is reset to its initial optimum cure time value, $t_R$. The molds are reloaded and closed, and the time remaining countdown starts over again.

The formulas set forth above assume a nonlinear relationship between the increase or reduction in mold temperature and cure time remaining for the article. However, the actual relationship is only valid within a range of ±54° F. of set point temperature.

Accordingly, in a particularly preferable form of the invention, the method includes the steps of initially evaluating $\Delta T$, which is the temperature difference between the measured temperature and the set point temperature. If the absolute value of $\Delta T$ exceeds 54° F., the algorithm does not proceed to calculate the appropriate decrement to cure time remaining, but instead sets an ALARM flag and exits the program. This continues for each time interval until the mold temperature moves to within 54° F. of the set point temperature. When the absolute value of $\Delta T$ is less than 54° F., then the algorithm resets the ALARM flag and proceeds to the calculation of the appropriate decrement to be applied to the cure time remaining, $t_R$.

An advantage of the method of the present invention is that it does not require temperature measurements to be made at regular, fixed time intervals since it compensates for time interval variations by computing the time interval since the last measurement and using that time interval to calculate the effective elapsed time which is then decremented from the cure time remaining, as previously described in accordance with the cure algorithm. Therefore, the algorithm can be used at any reasonable update rate.

Another advantage of the invention is that the control can handle all types of rubber compounds and their corresponding rates of vulcanization since such factors as equilibrium cure temperature, polymeric system constants, filler loading constants, and activation energy values, some of which may vary from compound to compound, are not utilized in the algorithm of the present invention. All that needs to be adjusted is the optimum cure time and temperature for the particular article to be cured.

Accordingly, it is an object of the present invention to provide a method for curing a rubber article which compensates for unavoidable deviations in mold temperature over the period of curing; a method of curing a rubber article which utilizes a relatively simple algorithm that does not require extensive data entry for each specific kind of rubber article; and a method of curing a rubber article which is very accurate when mold temperatures are within a range of ±54° F. (30° C.) of the set point temperature.

Other objects and advantages of the invention will be apparent from the following description, the accompanying drawings and the appended claims.

BRIEF DESCRIPTION OF THE DRAWINGS

FIG. 2 is a graph representating the relationship between the temperature variation above and below set point or optimum cure temperature to the decrement to time remaining (D) to effect cure over three 18° F. octaves above and below set point temperature.

DETAILED DESCRIPTION OF THE PREFERRED EMBODIMENT

Figure 1:
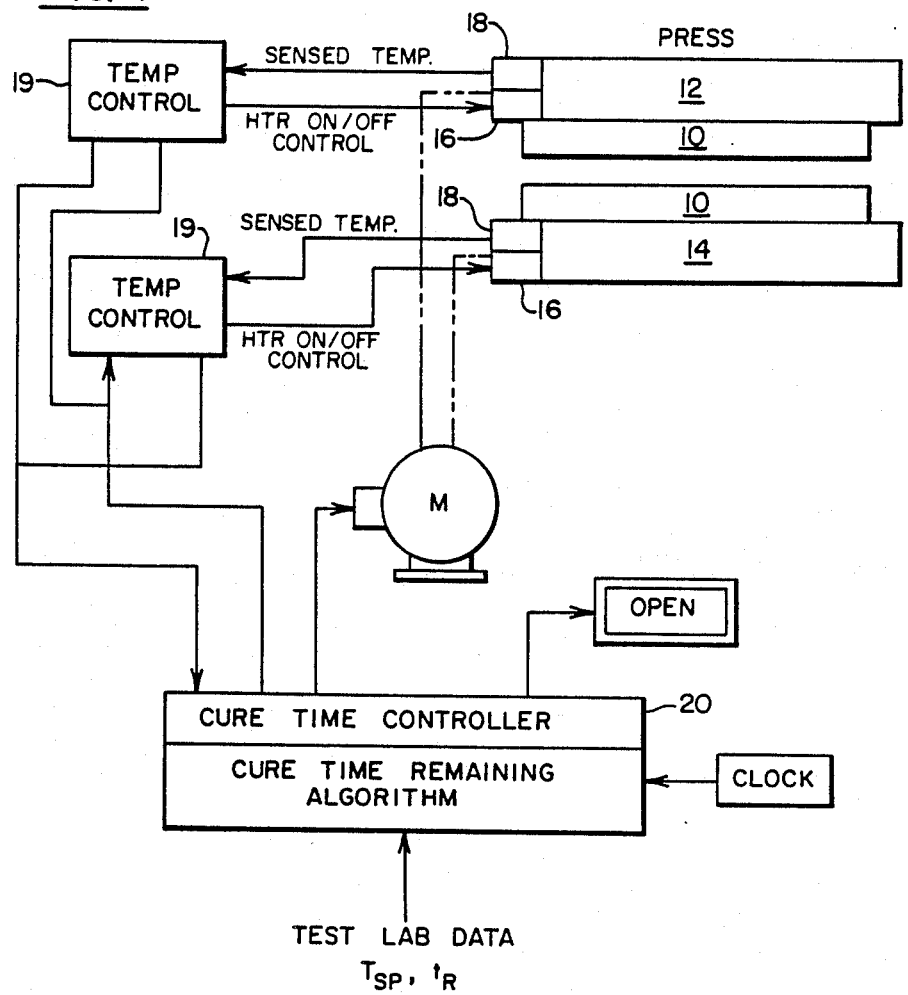
FIG. 1 is a schematic representation of the apparatus used to perform the method of the present invention.

As shown in FIG. 1, the apparatus utilized to perform the method of the present invention includes a two part mold, generally designated 10, having upper and lower platens 12, 14, each with a heating element (not shown) actuated by a heater 16 having a thermostat 18. The platens 12, 14 include a temperature probe (not shown) which is connected to temperature controllers 19 which include computer control. The temperature controllers 19 are connected to, and receive set point temperature from, a cure time controller 20. The temperature controllers 19 give actual sensed temperature back to the cure time controller 20.

The computer control is programmed to measure the temperature within the upper and lower platens 12, 14 periodically during a cure. The temperature controllers 19 are programmed with an algorithm that compares the temperature readings with an ideal or set point temperature which is unique to the article being cured and turns the platen heating elements on and off according to a standard proportional integral differential (PID) control algorithm. The cure time controller 20 uses the measured temperature received from the temperature controllers 19 to calculate the time remaining for cure according to the present invention.

The algorithm utilizes the well-known relationship that a rate of cure doubles for each increment of 18° F. (10° C.) above a predetermined set point temperature and decreases by a factor of one-half for each 18° F. (10° C.) increment below the set point temperature. This relationship is graphically illustrated in FIG. 2.

Figure 3A:
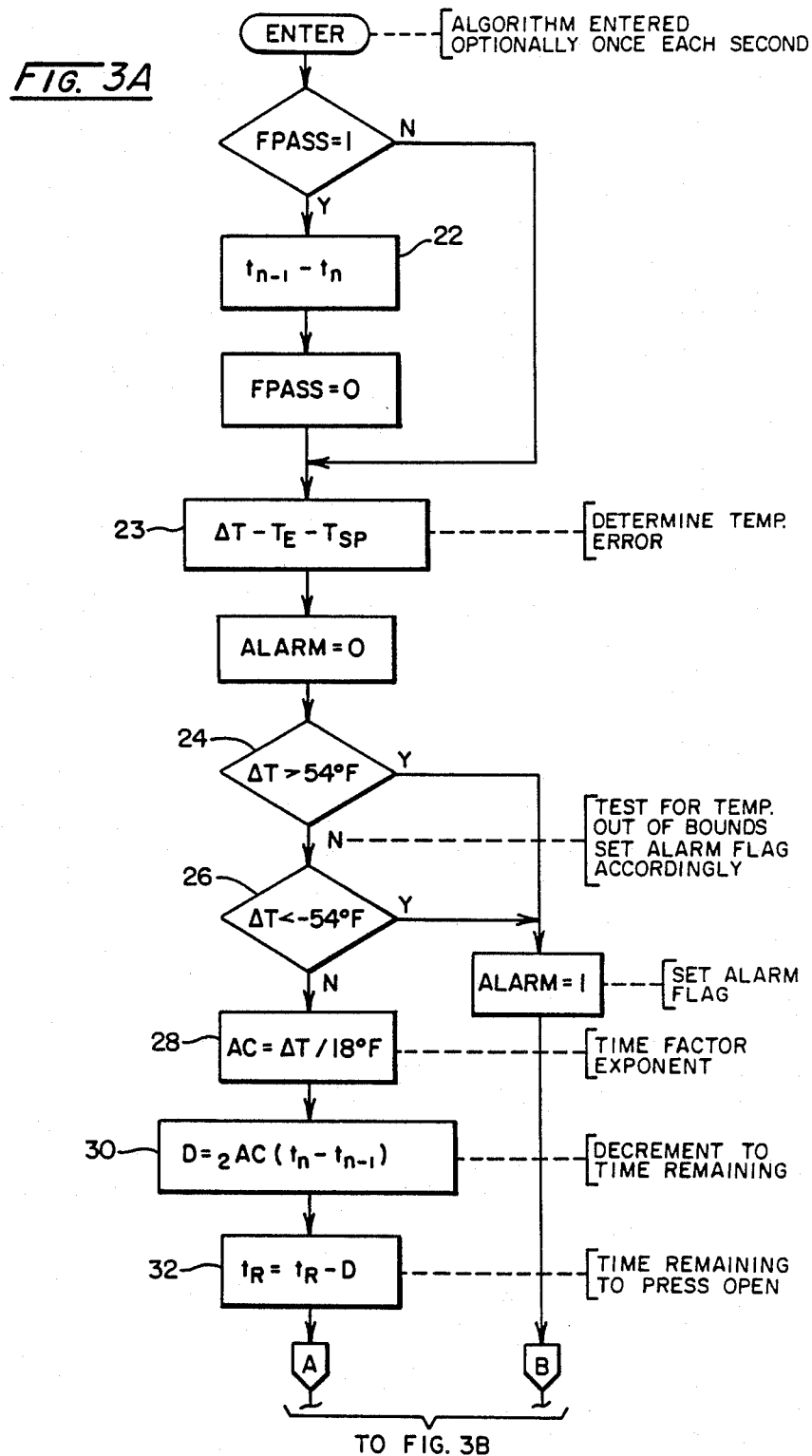
FIGS. 3A and 3B show a flow chart illustrating the algorithm utilized by the control shown in FIG. 1.
Figure 3B:
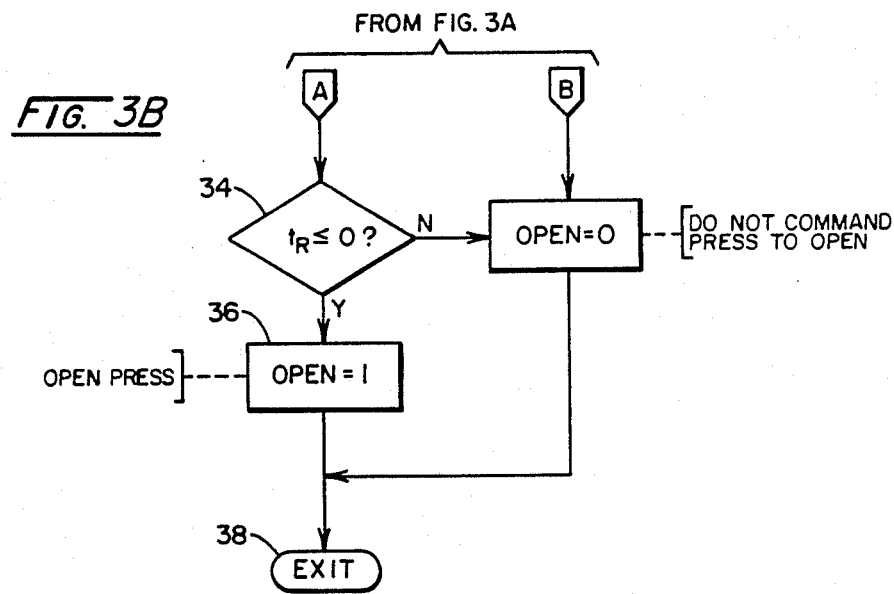

The algorithm is implemented in the cure time controller 20 and is shown in the form of a flow chart in FIGS. 3A and 3B. In the preferred embodiment, the cure time controller 20 is a digital computer with an internal clock. Prior to running the algorithm, the cure time controller 20 is programmed with an optimum cure temperature ($T_{SP}$) and an optimum cure time ($T_R$) which are determined from test lab data (see FIG. 2). The first step of the algorithm is to initialize the value of $t_{n-1}$ to the present clock reading of the computer 21. This is only done during the first initialization pass through the algorithm, or any time that the system has been idle for a period of time. It is accomplished by a calling program which sets a first pass flag, FPASS, to one causing the algorithm to reinitialize the parameter $t_{n-1}$, as is shown generally at 22.

The second step is to determine the temperature error ($\Delta T$); that is, the difference, if any, between the measured temperature of the mold 10 ($T_E$) and the set point temperature ($T_{SP}$), indicated at box 23.

Next, as shown in boxes 24 and 26, it is determined whether the temperature difference ($\Delta T$) is greater than ±54° F. (30° C.). If so, the temperature difference is too great for the algorithm to provide an accurate correction and the algorithm flags the controller 20 to wait (ALARM=1) and immediately exists the program.

If the value for $\Delta T$ is within the 54° F. range, the time factor exponent (AC) is calculated, as shown in box 28. The time factor exponent represents the number of octaves of 18° F. increments comprising the temperature difference. The decrement to cure time remaining, D, is then calculated, as shown in box 30, utilizing the formula $$D = 2^{AC}(t_n - t_{n-1})$$

where $(t_n - t_{n-1})$ represents the difference between the computer clock reading this frame $(t_n)$ and the clock reading on the past frame $(t_{n-1})$, i.e., the total clock time lapse since the last temperature measurement. The effective cure time or decrement to cure time remaining, D, is thus calculated from the actual cure time in accordance with the relationship illustrated in FIG. 2.

Finally, the time remaining to effect complete cure is calculated, as shown in box 32. This calculation utilizes the equation:

$$t_R = t_R - D$$

where $t_R$ is the cure time remaining and D, the decrement to cure time remaining, is the effective cure time elapsed since the last temperature measurement. Again, when this algorithm is performed for the first time, $t_R$ is equal to the value $T_R$ of the optimum cure time initially read into the controller 20. For each succeeding temperature measurement, the value $t_R$ is updated by decrementing the cure time remaining by the effective cure time elapsed since the last temperature measurement. This gives a cure time remaining which is made available for operator display. When $t_R$ is less than or equal to zero, shown at box 34, the press is opened, as shown at box 36.

The method of the invention is performed as follows. The article to be cured, which preferably is a rubber article having a thickness not exceeding ¼ inch, is selected and the optimum cure time and temperature is determined from an appropriate curemeter curve. The values $T_{SP}$ and $T_R$ corresponding to the optimum cure temperature and cure time respectively, are programmed into the cure time controller 20. The mold is then raised to the optimum temperature and the article is placed into the mold cavity and the press is closed to begin the curing process. The control may be programmed to measure the temperature of the platens 12, 14 periodically (such as every 0.5 seconds or every 1, 2, 5, or 10 seconds) or may be measured randomly as a background task if timing is not critical. With each temperature measurement, the value for $t_R$ is decremented by D seconds according to step 32 of the algorithm shown in FIG. 3.

If the mold temperature remains at the optimum set point, the "cure time remaining" count down timer will count down at the rate of one second-per-real-time second, so that the time to effect cure will equal the optimum cure time. If the temperature rises, for example 18° F. above set point, count down will occur at a rate of 2 second per second, so that the actual cure time will be half of the optimum cure time. Conversely, if the temperature drops to 18° F. below set point temperature, for example, cure will proceed at a rate one-half second per second of real time. At the end of the cure, when $t_R \leq 0$, the cure time controller 20 actuates the mold 10 to open. In an alternate embodiment, the control 20 generates a signal alerting a mold operator to open the mold and remove the cured article.

In another embodiment of the method, the article to be cured may be placed into the mold 10 prior to the initial preheating of the mold to the set point temperature. The initial preheating may then be monitored by cure time controller 20 and the cure time adjusted accordingly by the algorithm of FIG. 3 as the molds warm up to temperature.

While the methods herein described constitute preferred embodiments of this invention, it is to be understood that the invention is not limited to these precise methods, and that changes may be made therein without departing from the scope of the invention.

What is claimed is:

1. A method of curing a rubber article in a mold of the type wherein a temperature of a cavity thereof may vary above or below an optimum temperature, comprising the steps of:
   (a) selecting an optimum cure time and temperature for said article;
   (b) raising the temperature of said mold to said optimum temperature;
   (c) placing said article in said mold cavity and closing said mold;
   (d) at a time subsequent to step (c), measuring the temperature of said mold and calculating a decrement to cure time remaining of said optimum cure time with the formulas $$D = 2^{AC}(t_n - t_{n-1})$$

and $$t_R = t_R - D$$

where D is a decrement to cure time remaining, AC is a time factor exponent equalling $(T_E - T_{SP})/18°$ F. (10° C.), where $T_E$ is measured temperature and $T_{SP}$ is said optimum cure temperature; $(t_n - t_{n-1})$ is the number of real-time seconds since the last temperature measurement, and $t_R$ is time remaining to effect cure; and
   (e) repeating step (d) until $t_R$ is $\leq 0$, and then opening said mold and removing said article therefrom.

2. The method of claim 1 wherein step (d) is interrupted if the temperature of said mold is not within 54° F. of said optimum cure temperature.

3. A method of curing rubber contained within a heated mold cavity comprising the steps of:
   (a) setting a cure time remaining $(t_R)$ equal to an optimum cure time $(T_R)$ and the mold temperature to an optimum cure temperature $(T_{SP})$ corresponding to said optimum cure time for said rubber;
   (b) measuring the temperature $(T_E)$ of said mold;
   (c) determining the temperature error corresponding to the difference between said measured temperature $(T_E)$ and the optimum cure temperature $(T_{SP})$;
   (d) calculating a time multiplication factor based on said temperature error;
   (e) calculating an actual elapsed cure time since the last temperature measurement;
   (f) calculating an effective elapsed cure time since the last temperature measurement by multiplying said actual elapsed cure time by said time multiplication factor;
   (g) subtracting said effective elapsed cure time from said cure time remaining $(t_R)$ to update said cure time remaining; and
   (h) repetitively performing steps (c) through (g) until said remaining cure time is less than or equal to zero at which time said mold is opened.

4. A method according to claim 3 wherein step (b) is performed periodically.

5. A method according to claim 3 wherein said method is interrupted if said temperature error exceeds 54° F. (30° C.).

6. A method according to claim 3 wherein said time multiplication factor equals $2^{(T_E - T_{SP})/18°}$ F. (10° C.).

* * * * *